United States Patent [19]

Hanyu et al.

[11] Patent Number: 5,325,219
[45] Date of Patent: Jun. 28, 1994

[54] CHIRAL SMECTIC LIQUID CRYSTAL DEVICE HAVING POLYIMIDE ALIGNMENT LAYER WITH FLUOROALKYL SIDE CHAIN

[75] Inventors: Yukio Hanyu, Atsugi; Masanobu Asaoka, Yokohama, both of Japan

[73] Assignee: Canon Kabushiki Kaisha, Tokyo, Japan

[21] Appl. No.: 968,323

[22] Filed: Oct. 29, 1992

[30] Foreign Application Priority Data

Oct. 30, 1991 [JP] Japan ................. 3-310126
Oct. 30, 1991 [JP] Japan ................. 3-310127

[51] Int. Cl.$^5$ ............... G02F 1/1337; G02F 1/13; C09K 19/00
[52] U.S. Cl. ................. 359/78; 359/100; 428/1
[58] Field of Search ............ 359/78, 100; 428/1

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,655,561 | 4/1987 | Kanbe et al. | 350/350 S |
| 4,883,344 | 11/1989 | Okada et al. | 350/339 R |
| 5,129,727 | 7/1992 | Hanyu et al. | 359/75 |
| 5,173,342 | 12/1992 | Sato et al. | 359/78 |
| 5,186,985 | 2/1993 | Estes et al. | 359/78 |
| 5,188,870 | 2/1993 | Brosig | 359/78 |
| 5,192,596 | 3/1993 | Hanyu et al. | 359/78 |
| 5,250,330 | 10/1993 | Asaoka et al. | 359/78 |
| 5,268,780 | 12/1993 | Hanyu et al. | 359/78 |

FOREIGN PATENT DOCUMENTS

| | | |
|---|---|---|
| 0415447 | 3/1991 | European Pat. Off. |
| 62-175713 | 8/1987 | Japan |
| 1-204025 | 8/1989 | Japan |
| 1-252934 | 10/1989 | Japan |

OTHER PUBLICATIONS

Orihara et al, "Effect of a Polyimide Coat on the Layer Structure in a Surface-Stabilized Ferroelectric Liquid Crystal Cell", Japanese Journal of Applied Physics, vol. 28, No. 4 (Apr. 1989), pp. L676–L678.

*Primary Examiner*—Anita P. Gross
*Attorney, Agent, or Firm*—Fitzpatrick, Cella, Harper & Scinto

[57] ABSTRACT

A liquid crystal device improved in contrast and freeness from flickering and after image is formed by disposing a liquid crystal between a pair of substrates, at least one of which has an alignment film of a polyimide having a fluoroalkyl chain group as a side chain. The fluoroalkyl chain group may be contained in a diamine-originated moiety or a carboxylic acid-originated moiety of the polyimide.

9 Claims, 8 Drawing Sheets

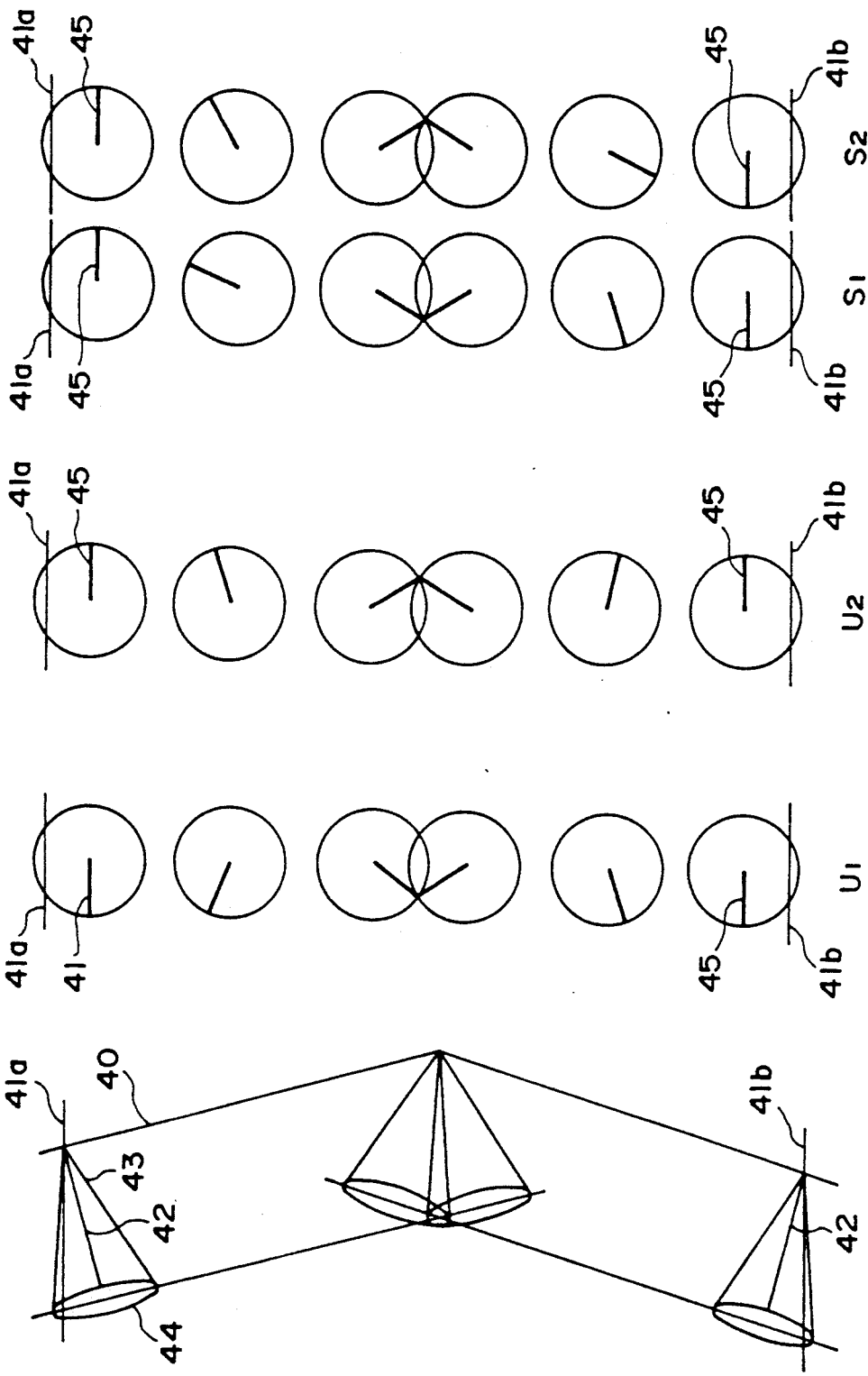

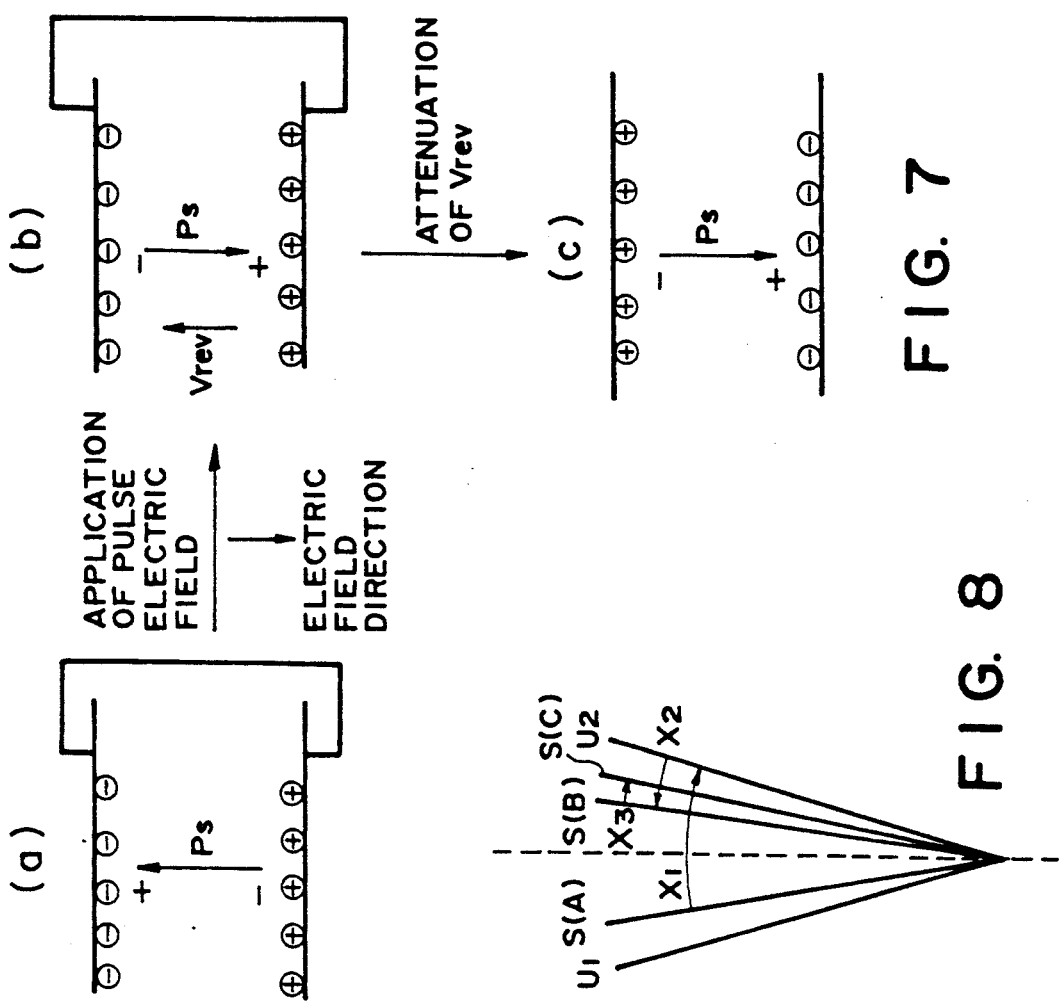
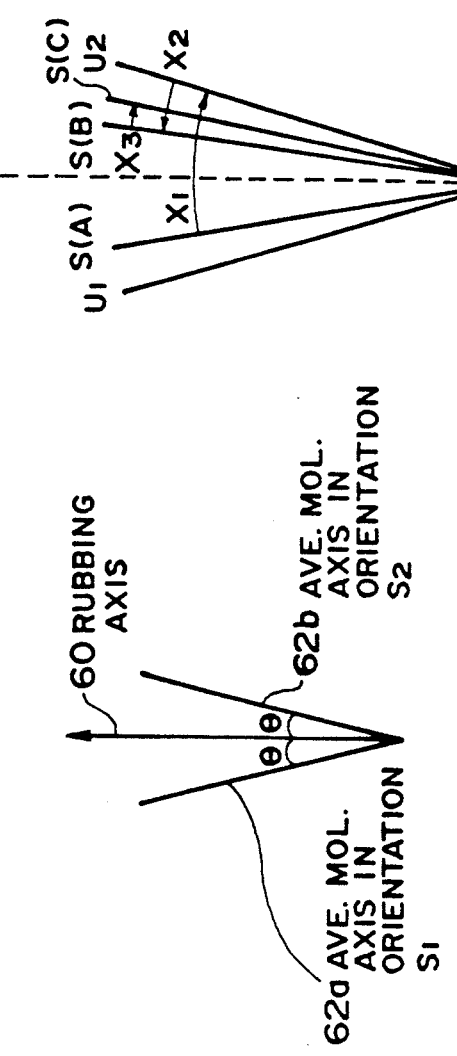
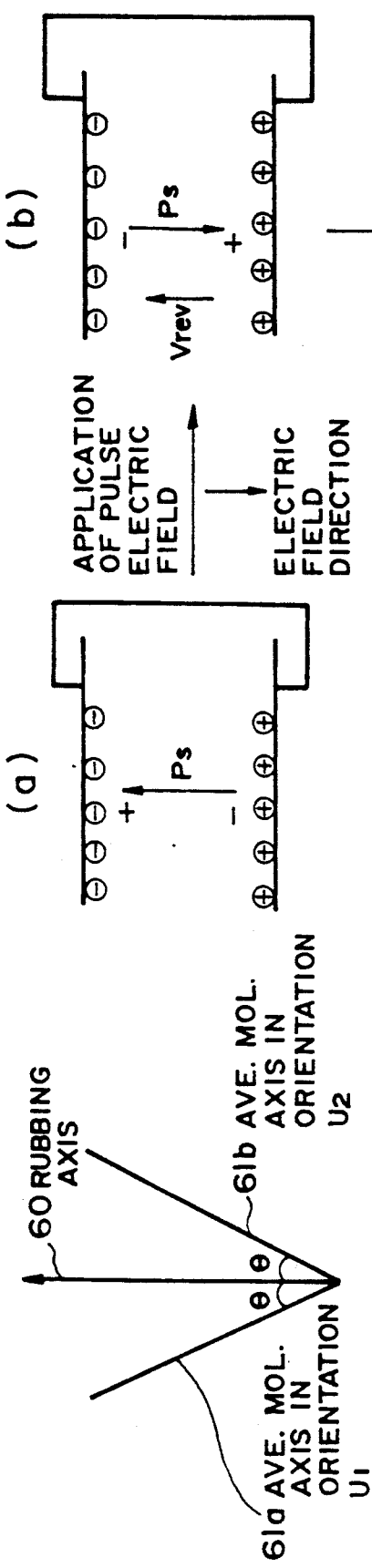
FIG. 7
FIG. 8
FIG. 6A
FIG. 6B

CHIRAL SMECTIC LIQUID CRYSTAL DEVICE HAVING POLYIMIDE ALIGNMENT LAYER WITH FLUOROALKYL SIDE CHAIN

FIELD OF THE INVENTION AND RELATED ART

This invention relates to a liquid crystal device to be used in a liquid crystal display device or a liquid crystal-optical shutter, etc., particularly a liquid crystal device using a ferroelectric chiral smectic liquid crystal, more particularly to a liquid crystal device improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2(\Delta nd/\lambda)\pi,$$

wherein $I_0$: incident light intensity,
$I$: transmitted light intensity,
$\theta$: tilt angle,
$\Delta n$: refractive index anisotropy,
$d$: thickness of the liquid crystal layer,
$\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 2B as described below) in a ferroelectric liquid crystal with a non-helical structure obtained by alignment with an alignment control film of the prior art has become smaller as compared with a tilt angle Ⓗ (the angle Ⓗ is a half of the apex angle of the cone shown in FIG. 2A as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3–8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. More specifically, it has been found that the tilt angle $\theta$ in a non-helical structure becomes smaller than the tilt angle Ⓗ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle Ⓗ in the helical structure. More specifically, in a ferroelectric liquid crystal having a non-helical structure, the ferroelectric liquid crystal assumes a twisted alignment wherein the liquid crystal molecules are arranged with a continuous twist at a twist angle $\delta$ from a molecule axis adjacent to an upper substrate to a molecule axis adjacent to a lower substrate in a direction of twist alignment with respect to the normal to the substrates.

Further, in case where a ferroelectric liquid crystal is driven in combination with a pair of polarizers arranged in cross nicols so that one polarizer direction is in alignment with the tilt angle $\theta$ so as to provide a large contrast, when a driving waveform for switching, e.g., from black to white, liquid crystal molecules causes a phenomenon (overshooting) that they are once moved to a position of Ⓗ and then to a position of $\theta$. This phenomenon is observed as a cause of flickering.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142-143.

SUMMARY OF THE INVENTION

Accordingly, an object of the present invention is to provide a liquid crystal device having solved the above-mentioned problems, particularly a chiral smectic liquid crystal device which provides a large tilt angle of a chiral smectic liquid crystal in a non-helical structure and provides a display capable of displaying a high-contrast image and yet free from after-image.

According to the present invention, there is provided a liquid crystal device, particularly a ferroelectric chiral smectic liquid crystal device, comprising: a pair of substrates and a liquid crystal disposed between the substrates; at least one of said pair of substrates having thereon an alignment film comprising a polyimide having a fluoroalkyl chain group.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 is a schematic sectional view showing an alignment state of a chiral smectic liquid crystal aligned according to the present invention.

FIG. 4 is an illustration of C-director alignments in a uniform alignment state.

FIG. 5 is an illustration of C-director alignments in a splay alignment state.

FIGS. 6A and 6B are plan views illustrating tilt angles $\theta$ in a uniform alignment state and a splay alignment state, respectively.

FIG. 7 is a sectional view showing a charge distribution, a direction of a spontaneous polarization $P_S$ and a direction of a reverse electric field Vrev.

FIG. 8 is a schematic plan view illustrating changes in tilt angle $\theta$ during and after application of an electric field.

DETAILED DESCRIPTION OF THE INVENTION

Figure 1:
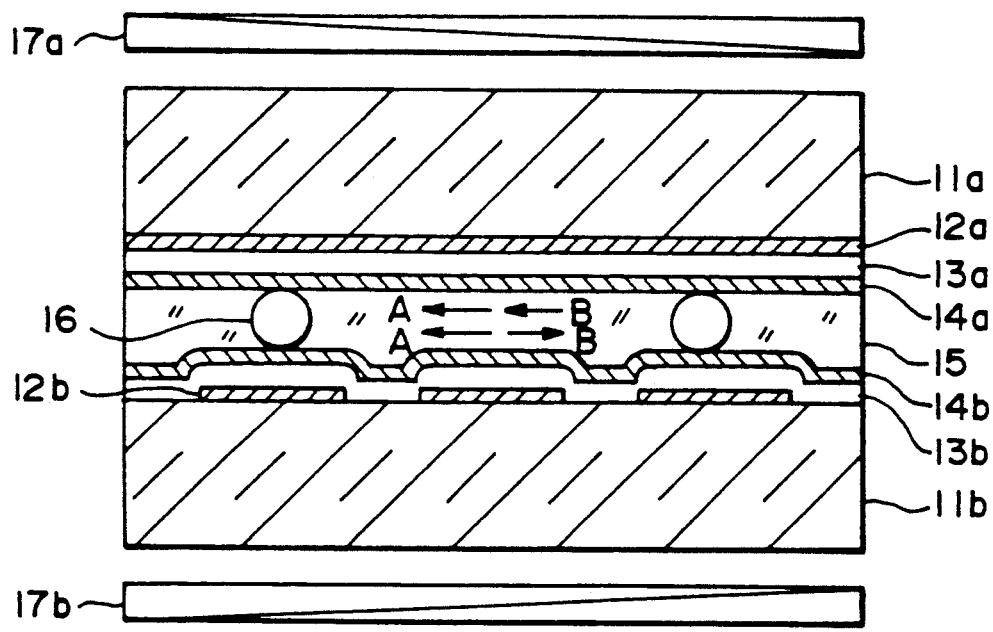
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200-1000 Å-thick insulating films 13a and 13b of $SIO_2$, $TiO_2$, $Ta_2O_5$, etc., and 50-1000 Å-thick alignment control films 14a and 14b.

In this instance, the alignment control films 14a and 14b have been treated by rubbing, as a uniaxial aligning treatment, in directions which are parallel to each other and in the same direction (indicated by arrows A in FIG. 1). It is also possible to rub the alignment control films 14a and 14b in directions, which are almost the same or opposite and cross each other at an intersection angle of 2-15 degrees. A chiral smectic liquid crystal 15 is disposed between the substrates 11a and 11b, and the spacing between the substrates 11a and 11b is set to provide the liquid crystal layer 15 with a thickness (e.g., 0.1-3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state. The thus formed cell structure is sandwiched between a pair of polarizers 17a and 17b arranged in cross nicols.

If the rubbing directions applied to the substrates 11a and 11b are generally parallel and the same, the liquid crystal molecular layers assume a bent chevron structure as shown in FIG. 3. On the other hand, if the rubbing directions applied to substrates 11a and 11b are generally parallel and opposite to each other indicated by arrows B in FIG. 1, the liquid crystal molecular layers assume an obliquely arranged structure.

According to our experiments, by using an alignment method using a specific polyimide alignment film treated by rubbing as explained with reference to Examples described hereinafter, there has been realized an alignment state which provides a large optical contrast between a bright and a dark state, particularly with respect to non-selected pixels during multiplexing drive as disclosed in U.S. Pat. No. 4,655,561, etc., and also is free from a delay in optical response leading to a problem of after-image in a display at the time of switching during such multiplexing drive.

According to the present invention, at least one of the alignment films 14a and 14b is constituted by a polyimide which may be obtained by dehydrocyclization under heating of a polyamide acid, e.g., obtained by a condensation reaction between a carboxylic anhydride and a fluorine-containing diamine.

Examples of the diamine may include those represented by the following formulae:

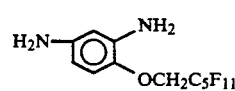

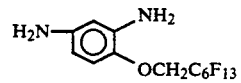

-continued
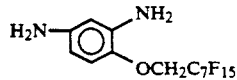
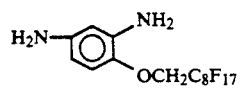
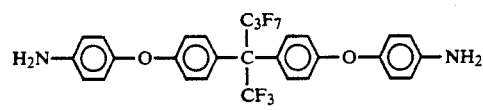
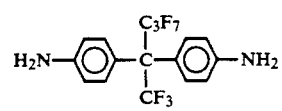
On the other hand, examples of the carboxylic anhydride may include those represented by the following formulae.
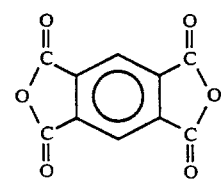
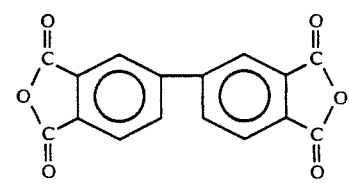
-continued
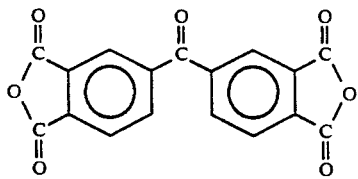
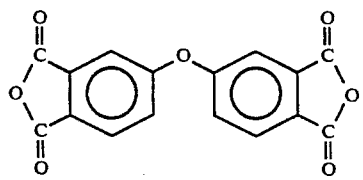
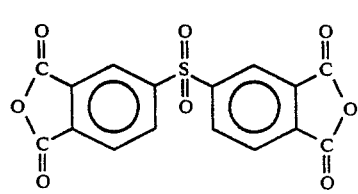
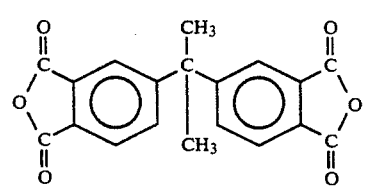
Examples of the polyimide obtained from a diamine having a fluoroalkyl chain group.
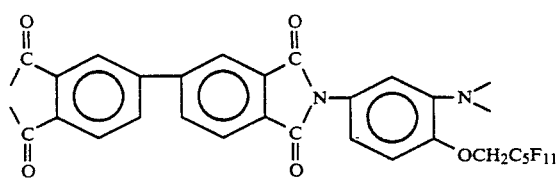
(1)
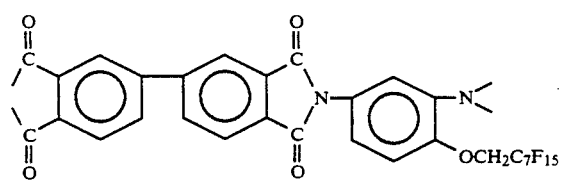
(2)
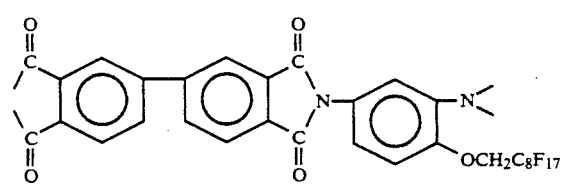
(3)
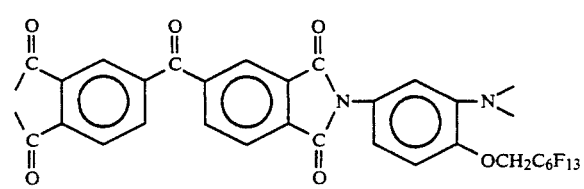
(4)

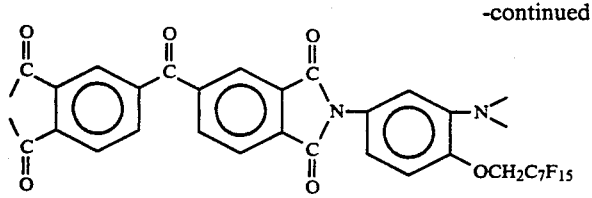 (5)
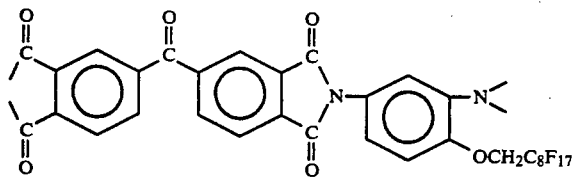 (6)
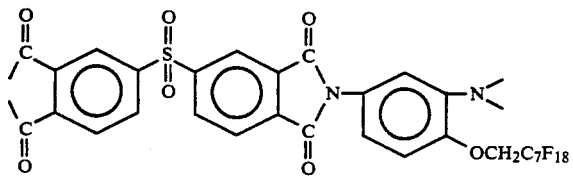 (7)
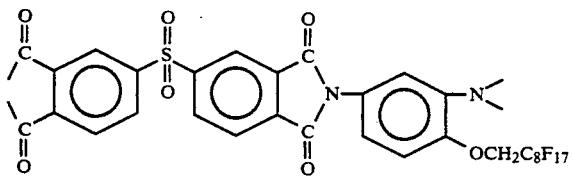 (8)
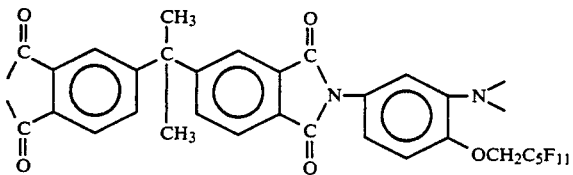 (9)
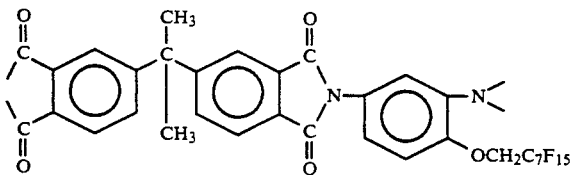 (10)
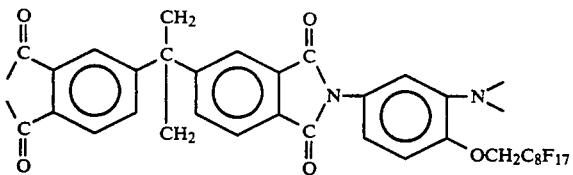 (11)
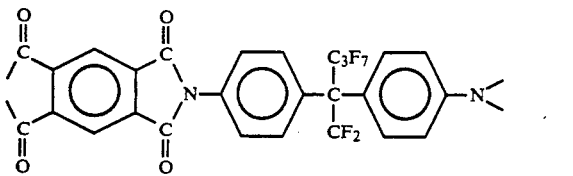 (12)
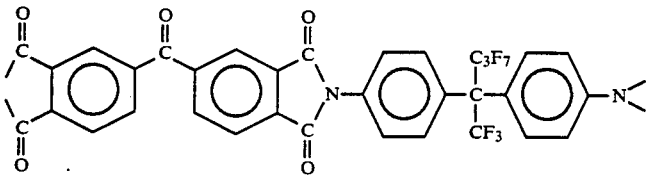 (13)

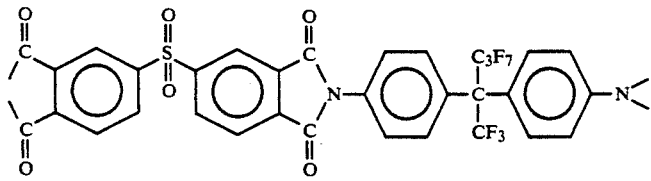
(14)

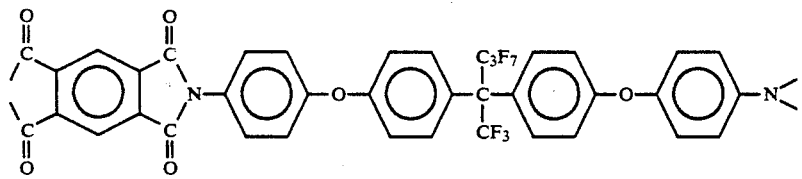
(15)

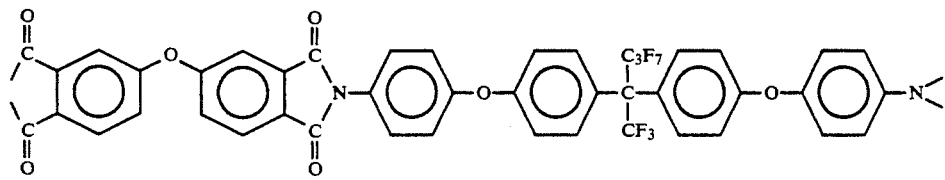
(16)

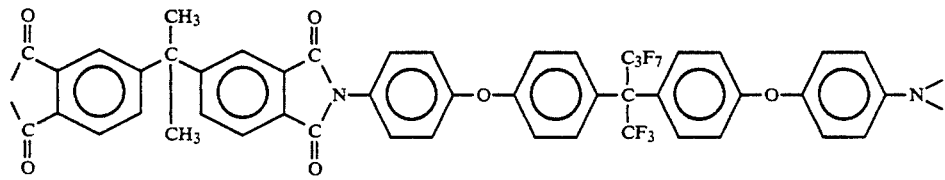
(17)

Among the above, those obtained from a diamine having a fluoroalkyl chain group as a side chain are particularly preferred. It is particularly preferred that the fluoroalkyl chain group is one represented by the following formula:

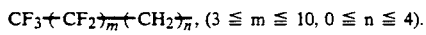

$CF_3\text{-}(CF_2)_m\text{-}(CH_2)_n\text{-}$, ($3 \leq m \leq 10$, $0 \leq n \leq 4$).

According to another preferred embodiment of the present invention, the present invention having a fluoroalkyl chain group may be obtained by dehydrocyclization under heating of a polyamide acid obtained by a condensation reaction between a fluoroalkyl chain group-containing carboxylic anhydride and a diamine.

It is particularly preferred that the carboxylic anhydride has a fluoroalkyl chain group in its side chain, particularly a fluoroalkyl chain group represented by the following formula:

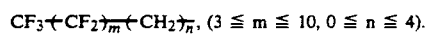

$CF_3\text{-}(CF_2)_m\text{-}(CH_2)_n\text{-}$, ($3 \leq m \leq 10$, $0 \leq n \leq 4$).

Examples of the carboxylic anhydride having a fluoroalkyl chain group may include those represented by the following formulae:

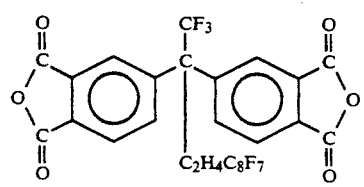

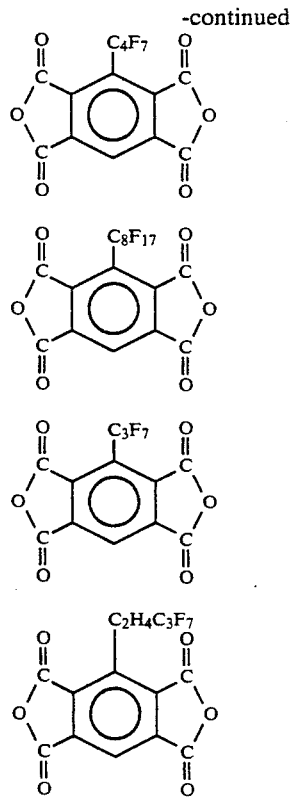

-continued

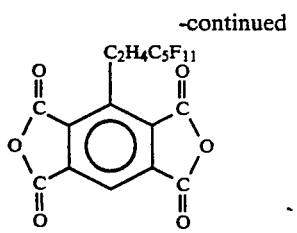

On the other hand, examples of the diamine may include those represented by the following formulae:

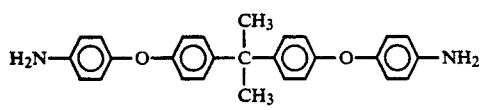

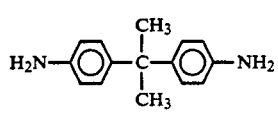

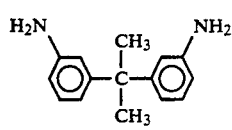

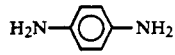

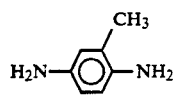

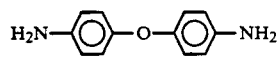

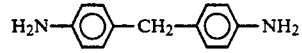

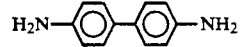

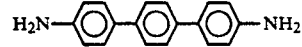

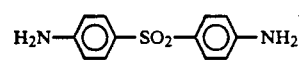

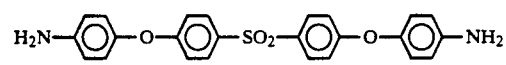

Further, it is also possible to form the polyimide in the form of a polyamideimide by dehydrocyclization of a polyamide acid obtained by a condensation reaction of a carboxylic anhydride, a diamine and a fluoroalkylamine. The diamine and the fluoroalkylamine may be used in a weight ratio of 99:1-60:40, preferably 98:2-70:30, more preferably 95:5-80:20.

Examples of the carboxylic anhydride used in this case may include those represented by the following formulae:

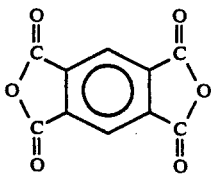

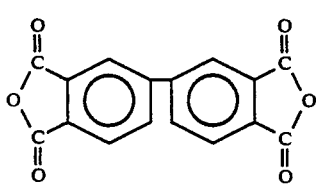

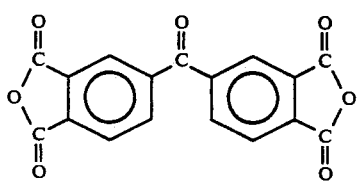

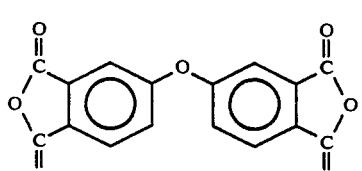

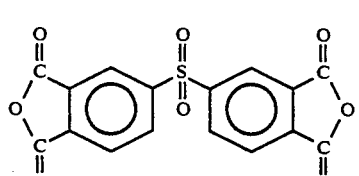

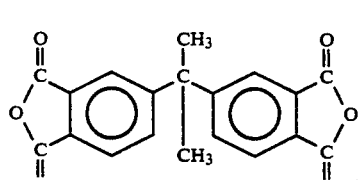

Examples of the fluoroalkylamine may include: $C_3F_7CH_2NH_2$, $C_6F_{13}CH_2NH_2$, $C_7F_{15}CH_2NH_2$, $C_8F_{17}CH_2NH_2$, $C_5F_{11}CH_2CH_2NH_2$, and $C_{10}F_{21}CH_2NH_2$.

Examples of the polyimide (in a sense including polyamideimide) may include those represented by the following formulae:

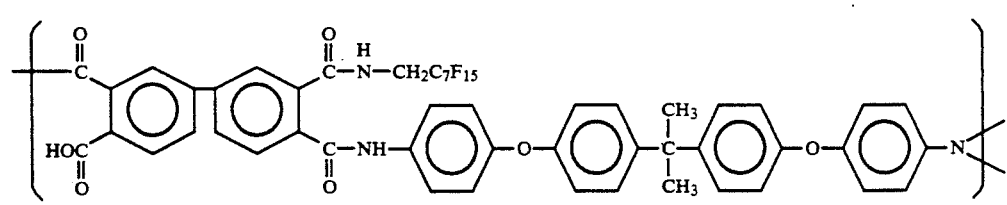
[1]
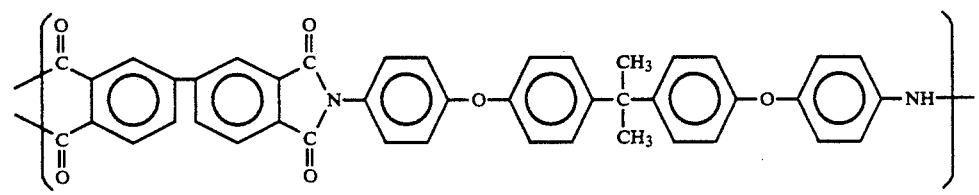
[2]
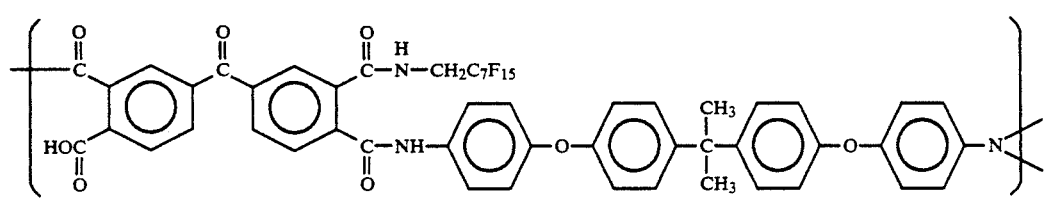
[3]
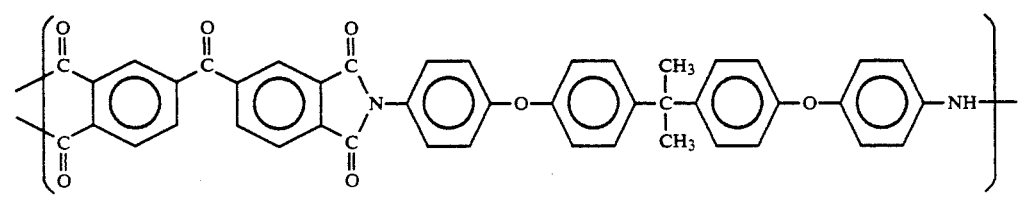
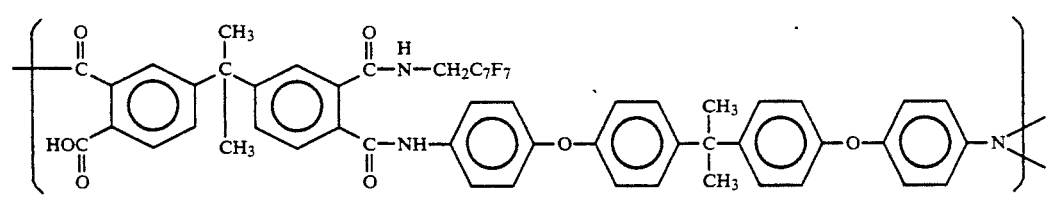
[4]
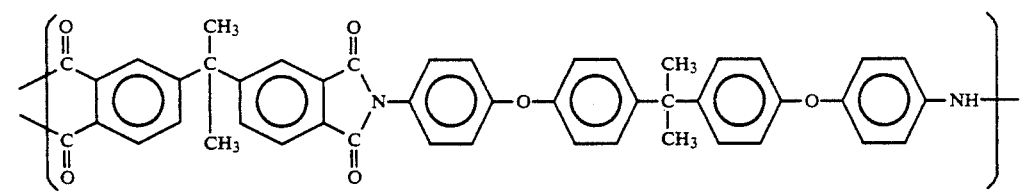
[5]
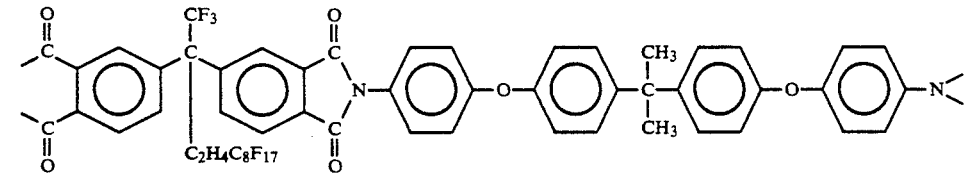
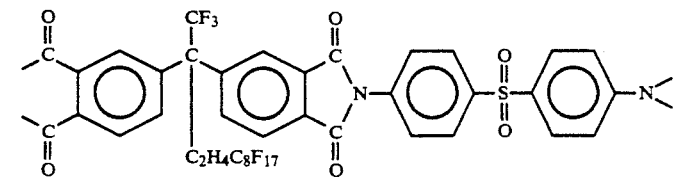

-continued
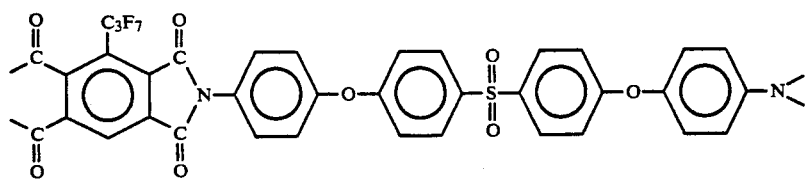 [6]
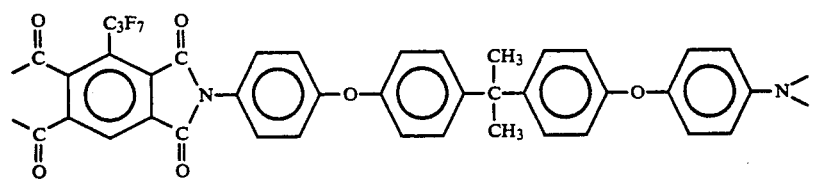 [7]
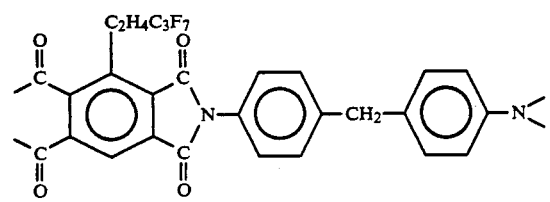 [8]
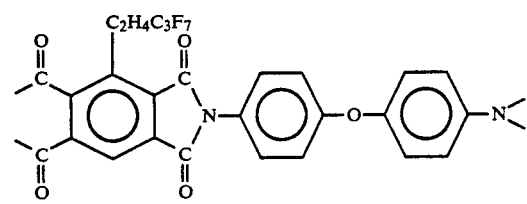 [9]
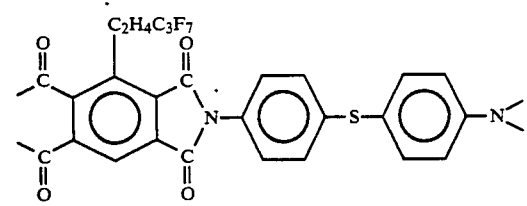 [10]
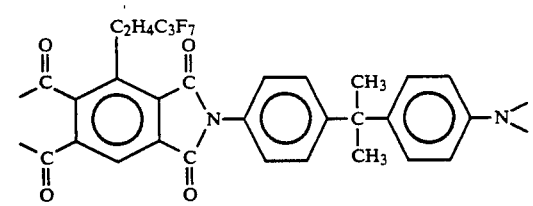 [11]
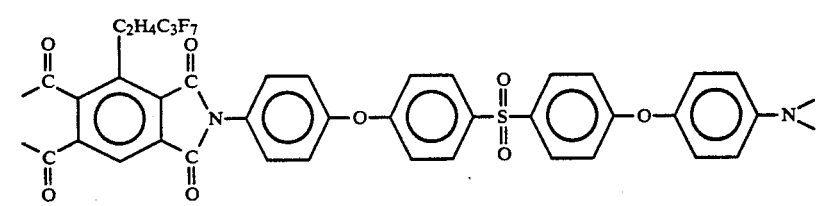 [12]
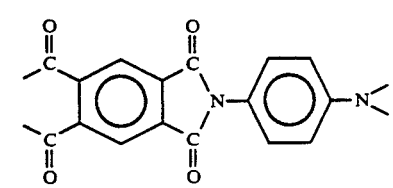 [13]

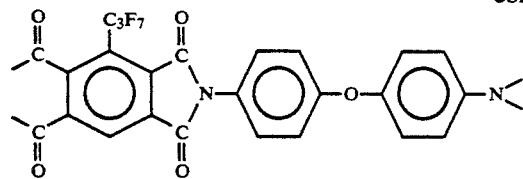 [13a]
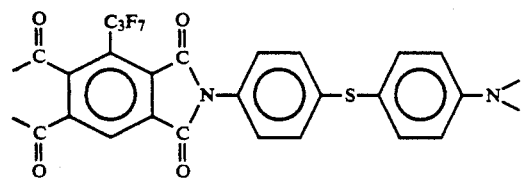 [14]
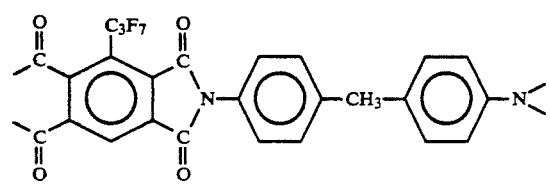 [15]
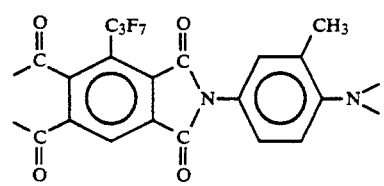 [16]
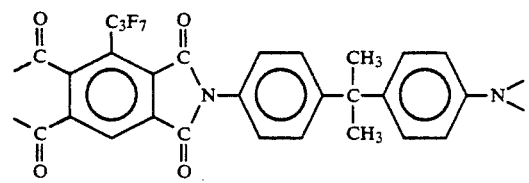 [17]
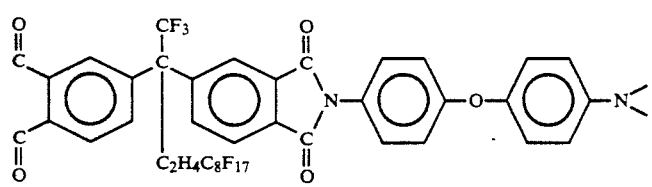 [18]
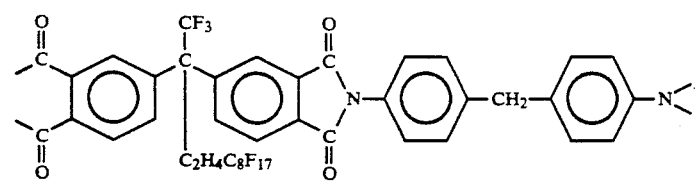 [19]
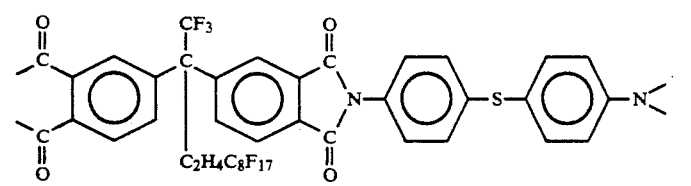 [20]
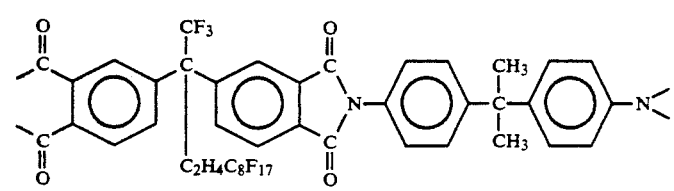 [21]

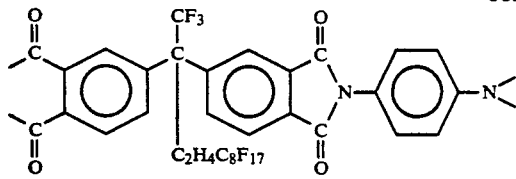

In the present invention, the polyimide (or the polyamide acid as the precursor) may preferably have a number-average molecular weight of 10,000–100,000, particularly 30,000–80,000, as measured by gel permeation chromatography corresponding to the molecular weights of standard polystyrene samples.

In order to form a film 14a or 14b of the polyimide (in a sense inclusive of polyamideimide) on a substrate, a solution of a polyamide acid as a precursor of the polyimide prepared as described above in a solvent, such as dimethylformamide, dimethylacetoamide, dimethyl-sulfoxide or N-methylpyrrolidone at a concentration of 0.01–40 wt. % may be applied onto the substrate by spinner coating, spray coating, roller coating, etc., and heated at 100°–350° C., preferably 200°–300° C., to cause dehydro-cyclization. The thus-formed polyimide film may be rubbed with a cloth, etc. The polyimide film may be formed in a thickness of, e.g., 30 Å–1 μm, preferably 200–2000 Å, so as to also function as an insulating film. In this case, the insulating films 13a and 13b can be omitted. Further, in case of forming the polyimide film on the insulating film 13a 13b, the polyimide film thickness may be set to 200 Å or less, preferably 100 Å or less.

The liquid crystal material 15 used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 micron or longer in cholesteric phase (measured at a mid temperature in the cholesteric range). Preferred examples of such a liquid crystal material may include liquid crystal materials (A) - (E) below comprising the following liquid crystals "LC-1", "80B" and "80SI*" in the indicated proportions by weight.

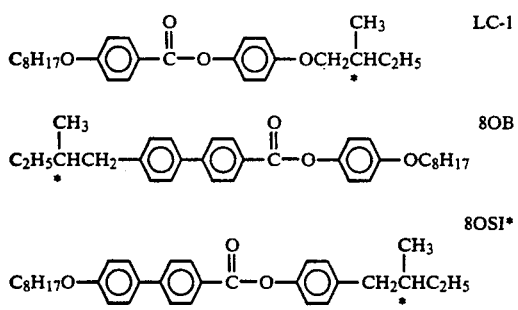

Figure 2A:
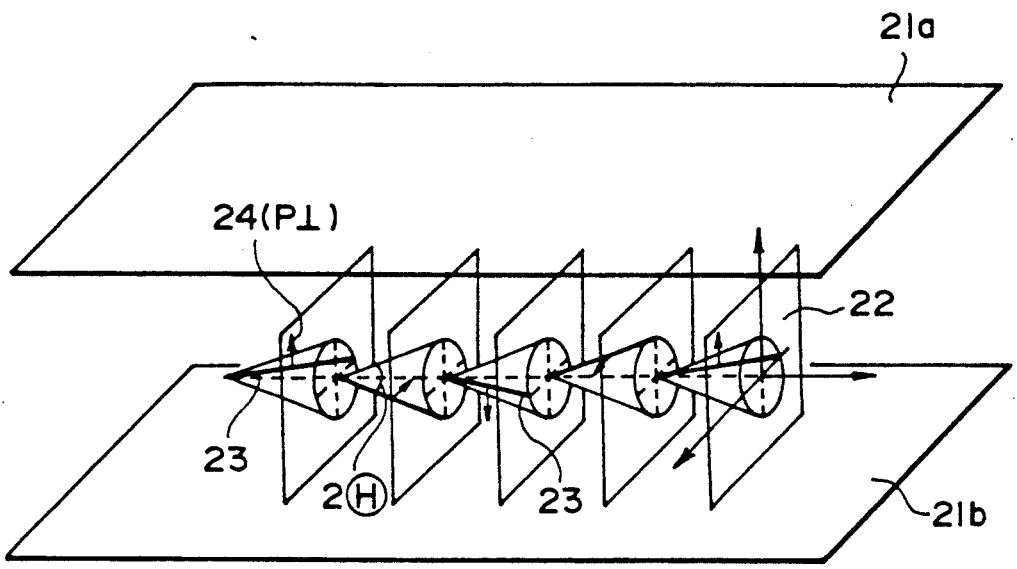
FIG. 2A is a perspective view showing schematically an alignment of a chiral smectic liquid crystal having a helical structure.

Liquid crystal material
(A) (LC-1)$_{90}$/(80B)$_{10}$
(B) (LC-1)$_{80}$/(80B)$_{20}$
(C) (LC-1)$_{70}$/(80B)$_{30}$
(D) (LC-1)$_{60}$/(80B)$_{40}$
(E) (80SI*)$_{100}$ FIG. 2A is a schematic illustration of a ferroelectric liquid crystal cell (device) for explaining operation thereof. Reference numerals 21a and 21b denote substrates (glass plates) on which a transparent electrode of, e.g., $In_2O_3$, $SNO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 each comprising a plurality of liquid crystal molecules are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 2B:
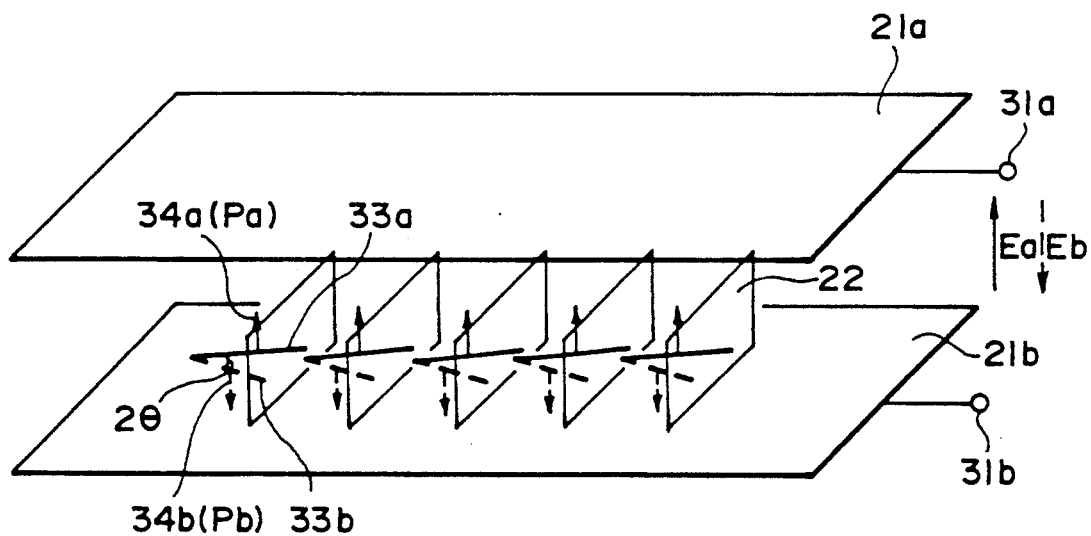
FIG. 2B is a perspective view showing schematically an alignment state of a chiral smectic liquid crystal having a non-helical structure.
Figure 9:
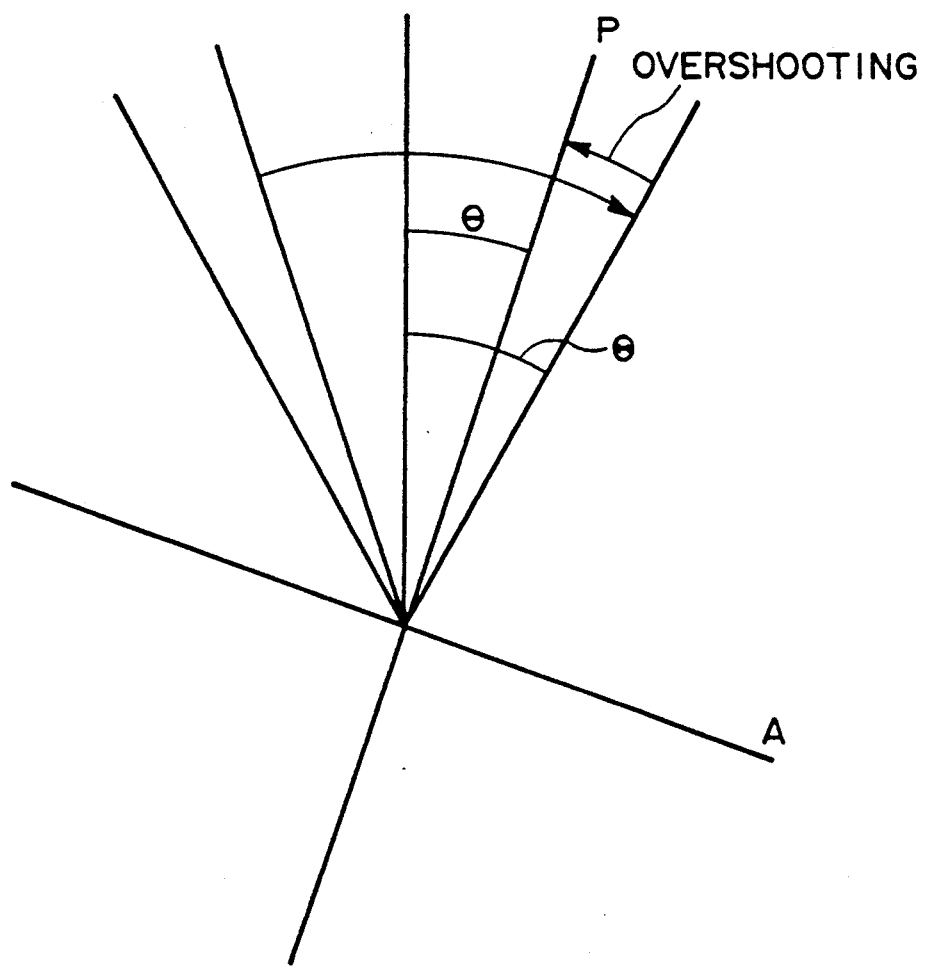
FIG. 9 is an illustration of an overshooting phenomenon.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 2B, thus providing a bistable condition. When an electric field Ea or Eb higher than a certain threshold level and different from each other in polarity as shown in FIG. 2B is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 2B. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 3 is a schematic sectional view showing an alignment state of liquid crystal molecules attained by the present invention, and FIG. 4 is a view showing alignment of corresponding C-directors.

Reference numerals 41a and 41b in FIG. 3 denote upper and lower substrates, respectively. Numeral 40 denotes a molecular layer composed of liquid crystal molecules 42, and liquid crystal molecules 42 are aligned so as to change their positions along the bottom face 44 (circular) of a cone 43. FIG. 4 more specifically shows a change in C-directors. Referring to FIG. 4, at $U_1$ are shown C-directors 45 (each being a projection of a molecular long axis onto an imaginary plane perpendicular to the normal to a molecular layer 40) in one stable orientation state, and at $U_2$ are shown C-directors 45 in the other stable orientation state.

On the other hand, an alignment state attained by a conventional rubbing-treated polyimide film may be represented by a C-director diagram of FIG. 5, which shows an alignment state wherein molecular axes are twisted in a large degree from the upper substrate 41a to the lower substrate 41b to provide a smaller tilt angle $\theta$.

FIG. 6A is a schematic plan view illustrating a tilt angle $\theta$ in an alignment state where C-directors 45 assume a state shown in FIG. 4 (referred to as "uniform alignment state"), and FIG. 6B is a schematic plan view illustrating a tilt angle $\theta$ in an alignment state where C-directors 45 assume a state shown in FIG. 5 (referred to as "splay alignment state"). In these figures, reference numeral 60 denotes a rubbing axis provided to the above-mentioned fluorine-containing polyimide film, numeral 61a denotes an average molecular axis in the orientation state $U_1$, numeral 61b denotes an average molecular axis in the orientation state $U_2$, numeral 62a denotes an average molecular axis in the orientation state $S_1$, and numeral 62b denotes an average molecular axis in the orientation state $S_2$. The average molecular axes 61a and 61b can be switched to each other by applying voltages of mutually opposite polarities. Similar switching is caused between the average molecular axes 62a and 62b.

Next, the effectiveness of the uniform alignment state with respect to a delay in optical response (after-image) due to a reverse electric field Vrev is explained.

If the capacitance of an insulating layer constituting a liquid crystal cell is denoted by $C_i$, the capacitance of a liquid crystal layer is denoted by $C_{LC}$ and the spontaneous polarization of the liquid crystal is denoted by $P_S$, Vrev causing after-image is expressed by the following equation.

$$Vrev = 2P_S/(C_i + C_{LC})$$

FIG. 7 is a schematic sectional view illustrating changes in charge distribution direction of $P_S$ and direction of the reverse electric field in a liquid crystal cell. At FIG. 7(a), there is shown a distribution of ⊕ and ⊖ charges in a memory state before application of a pulse electric field, where the spontaneous polarization is directed from ⊕ charges to ⊖ charges. At FIG. 7(b) is shown a state immediately after removal of a pulse electric field, when the direction of the spontaneous polarization $P_S$ is opposite to that shown at FIG. 7(a) (thus, the liquid crystal molecules are inverted from one stable orientation state to the other orientation state) but the distribution of the ⊕ and ⊖ charges is similar to that shown at FIG. 7(a), so that a reverse electric field Vrev is generated as indicated by an arrow shown at FIG. 7(b). The reverse electric field Vrev disappears in a short time to provide a distribution of ⊕ and ⊖ charges as shown at FIG. 7(c).

Figure 10:
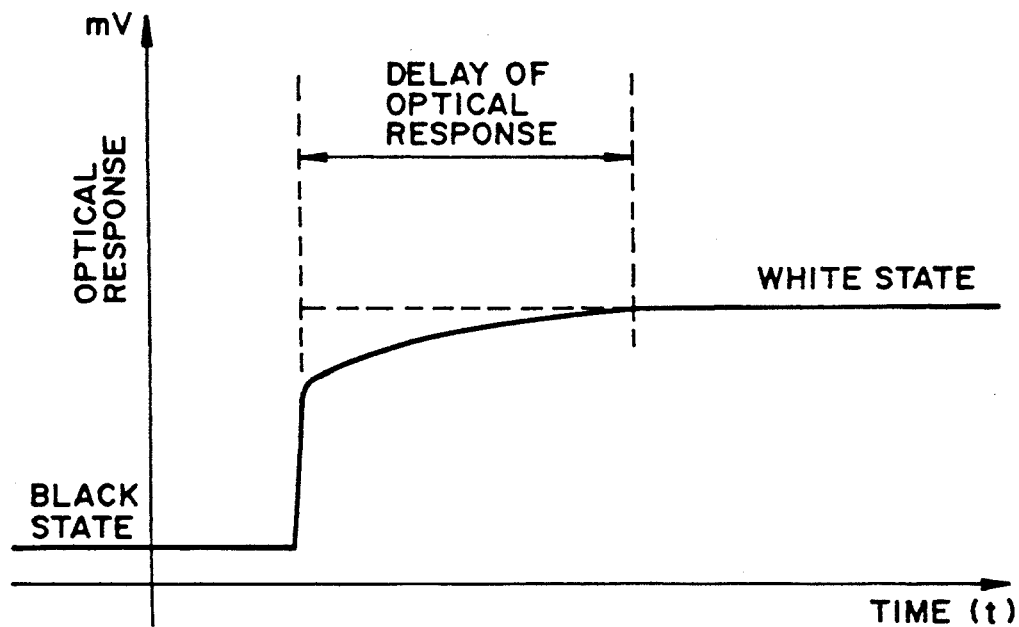
FIGS. 10 and 11 are graphs showing optical response characteristics according to a conventional device and the present invention, respectively.

FIG. 8 is a plan view showing a change in optical response in a splay alignment state given by a conventional polyimide alignment film in terms of a change in tilt angle $\theta$. Referring to FIG. 8, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle (H) along a path denoted by an arrow $X_1$, and immediately after the removal of the pulse electric field, the orientation is changed along a path denoted by an arrow $X_2$ to an average molecular axis S(B) in a splay alignment state providing a decreased tilt angle $\theta$ due to the action of the reverse electric field Vrev shown at FIG. 7(b). Then, as the reverse electric field Vrev attenuates as shown at FIG. 7(c), the orientation is changed along a path denoted by an arrow $X_3$ to an average molecular axis S(C) in a splay alignment state providing a stable orientation state having a somewhat increased tilt angle $\theta$. The resultant optical response in this case is shown in FIG. 10.

Figure 11:
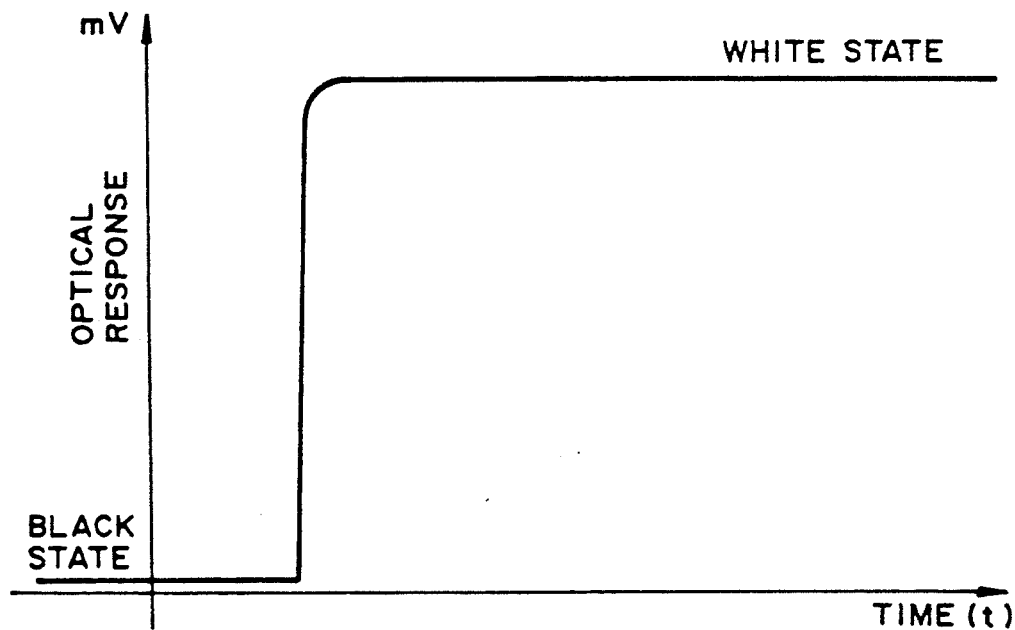

In the alignment state given by using a fluoroalkyl chain group-containing polyimide film of the present invention, the average molecular axes S(A), S(B) and S(C) in the splay alignment state shown in FIG. 8 are not caused but it is possible to form an alignment state with an average molecular axis giving a tilt angle $\theta$ which is close to a maximum tilt angle (H). An optical response at this time according to the present invention is shown in FIG. 11. FIG. 11 shows that a delay in optical response causing after-image is obviated and a high contrast in memory states is caused.

Hereinbelow, the present invention will be explained based on Examples.

EXAMPLE 1

Two 1.1 mm-thick glass plates each provided with a 1000 Å-thick ITO film were respectively coated with a 3.0 wt. % solution of a polyamide acid represented by the formula shown below in a mixture solvent of N-methylpyrrolidone/n-butylcellosolve=2/1 by means of a spinner rotating at 3000 rpm.

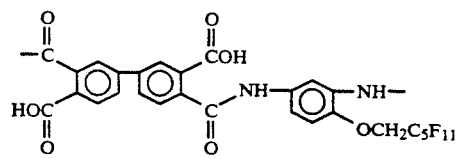

After the coating, the film was subjected to curing under heating at 250° C. for about an hour to form a 400 Å-thick film. The coating film was then rubbed in one direction with a nylon-planted cloth.

On one of the two glass plates thus treated, 1.5 microns alumina beads were dispersed, and the other glass plate was superposed thereon so that their rubbing axes were parallel to each other and disposed in the same direction to form a blank cell.

The blank cell was filled with a ferroelectric smectic liquid crystal ("CS-1014" (trade name), available from Chisso K.K.) under vacuum and, after sealing, was gradually cooled from isotropic phase at a rate of 0.5° C./hour to 30° C., whereby an alignment was effected. The "CS-1014" liquid crystal in the cell showed the following phase transition series.

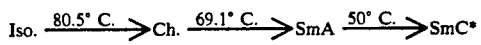

Iso.: isotropic phase,
Ch.: cholesteric phase,
SmA: smectic A phase,
SmC*: chiral smectic C phase.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle $\theta = 15$ degrees, transmittance in the brightest state$=36\%$, transmittance in the darkest state$=1.8\%$, contrast ratio$=20:1$.

Figure 13A:
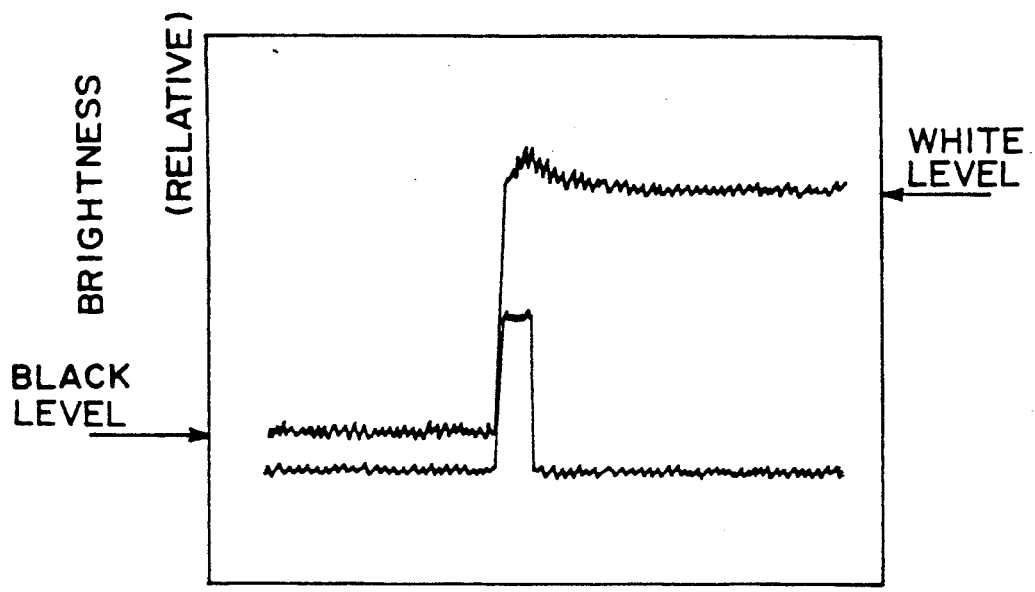
FIGS. 13A and 13B are graphs showing overshooting measured by a photomultiplier with respect to devices of Example 1 and Comparative Example 1.

When degree of overshooting was measured by a photomultiplier, little overshooting was observed as shown in FIG. 13A and it was not noticeable by eye observation. The delay in optical response causing after-image was 0.2 sec or less.

Figure 12:
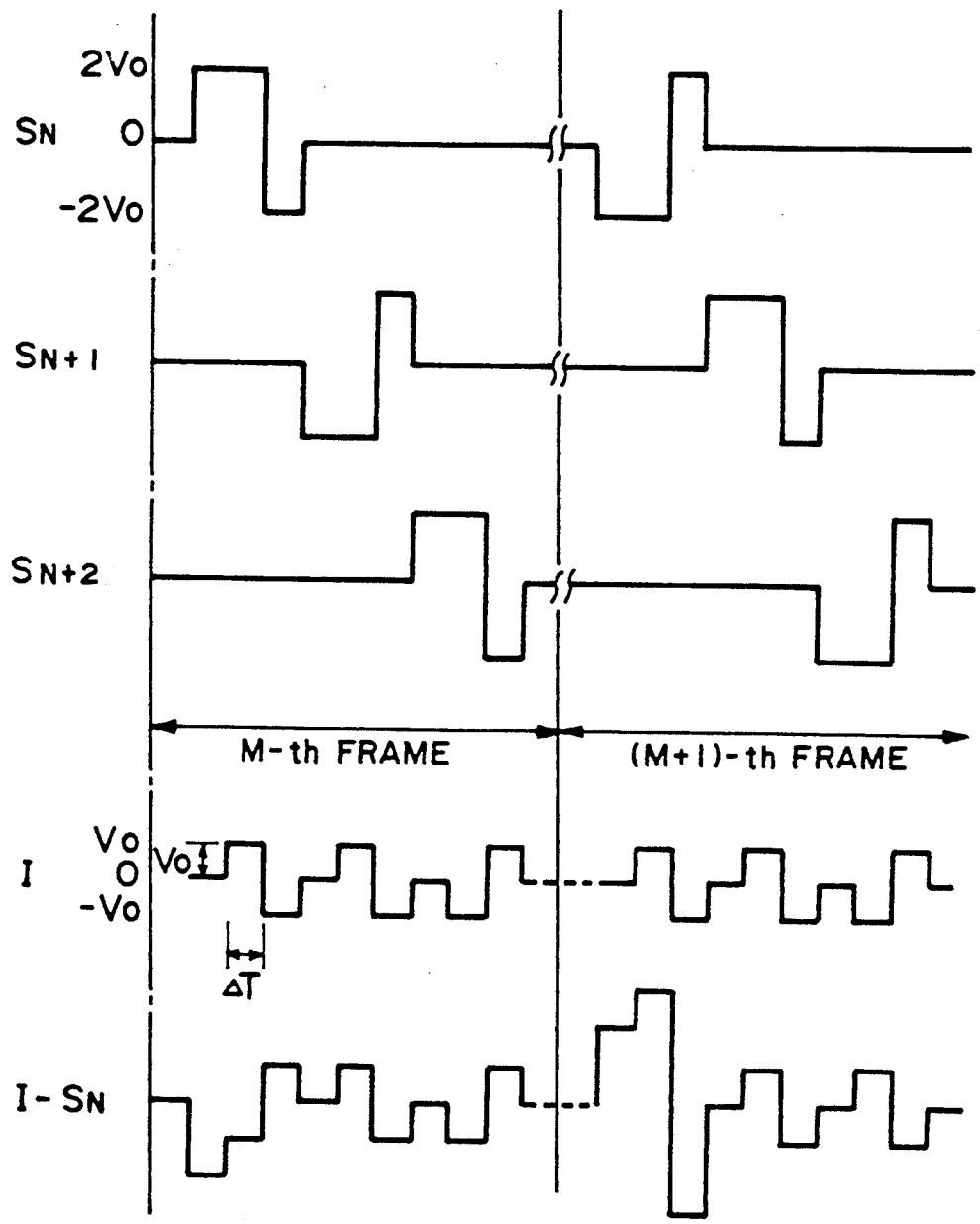
FIG. 12 is a waveform diagram illustrating driving waveforms used in an embodiment of the present invention.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at $(I-S_N)$ is shown a combined voltage waveform applied to the data line I and the scanning line $S_N$. In the above embodiment, the drive was performed under the conditions of $V_0=5-8$ volts and $\Delta T=20-70$ μsec.

EXAMPLES 2-5

Liquid crystal cells were prepared in the same manner as in Example 1 except that the alignment control films (in terms of precursor polyamide acids represented by the formulas and liquid crystal materials shown in Table 1 below were used.

The respective cells were tested in the same manner as in Example 1, whereby measured data of contrast ratio and delay time in optical response shown in Table 2 appearing hereinafter were obtained.

The respective cells were subjected to the multiplexing drive for display in the same manner as in Example 1, whereby similar results were attained with respect to contrast and after-image.

TABLE 1

| Example | Alignment film (precursor polyamide acid) | Liquid crystal material |
|---|---|---|
| 1 | [structure with $OCH_2C_7F_{15}$] | "CS-1014" (trade name) (FLC, Chisso K.K.) |
| 2 | [structure with $CH_3$, $CH_3$ groups and $OCH_2C_5F_{11}$] | "CS-1014" (trade name) (FLC, Chisso K.K.) |
| 3 | [structure with $C_3F_7$, $CF_3$ groups] | Liquid crystal material (C) described before |
| 4 | [structure with $CH_3$, $CH_3$ groups and $OCH_2C_5F_{11}$] | Liquid crystal material (C) described before |

TABLE 2

| Example | Contrast ratio | Delay in optical response (sec) | Flickering |
|---|---|---|---|
| 2 | 21:1 | 0.15 | none |
| 3 | 17:1 | 0.2 | none |
| 4 | 18:1 | 0.3 | none |
| 5 | 20:1 | 0.2 | none |

COMPARATIVE EXAMPLES 1-4

Liquid crystal cells were prepared in the same manner as in Example 1 except that the alignment control films (in terms of commercially available precursor polyamide acid varnish) and liquid crystal materials shown in Table 3 below were used. The measured data of contrast ratio, delay in optical response and flickering measured for, each of the cells are shown in Table 4 below.

Figure 13B:
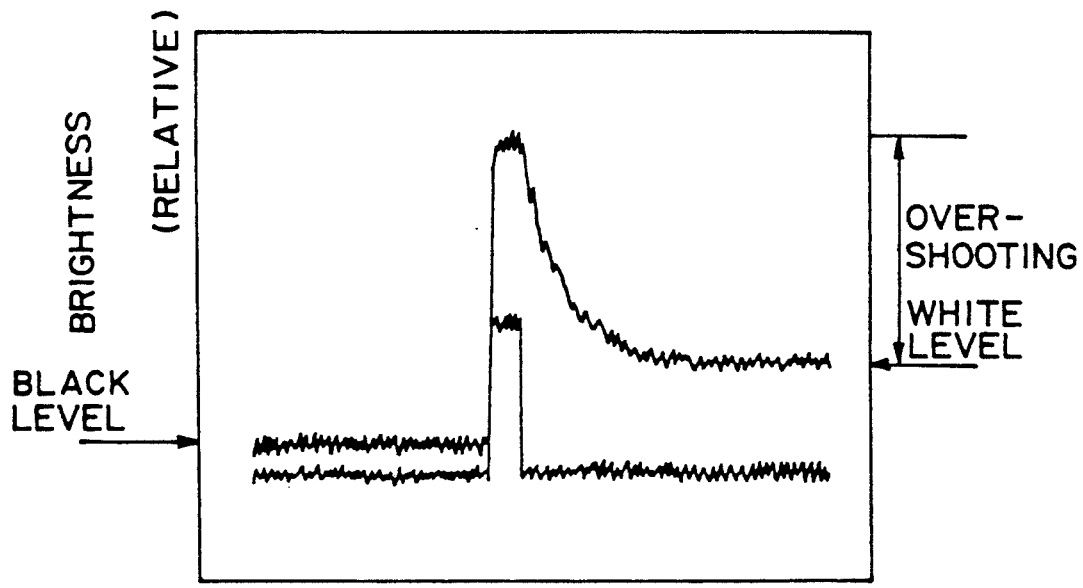

The respective cells were subjected to the multiplexing drive for display in the same manner as in Example 1, whereby the resultant contrasts were smaller than that given by Example 1 and after-image was recognized for each cell. Further, the degree of overshooting was measured by a photomultiplier with respect to Comparative Example 1, whereby a noticeable overshooting was observed and only a low contrast was attained as shown in FIG. 13B.

TABLE 3

| Comparative Example | Alignment film (polyamide acid varnish) | Liquid crystal material |
|---|---|---|
| 1 | "SP-710" (trade name) (aromatic polyimide varnish, Toray K.K.) | "CS-1014" (trade name) (FLC, Chisso K.K.) |
| 2 | "SP-710" (trade name) (aromatic polyimide varnish, Toray K.K.) | Liquid crystal material (C) described hereinbefore |
| 3 | "LQ-5200" (trade name) (polyimide varnish, Hitachi Kasei K.K.) | "CS-1014" |
| 4 | "LQ-5200" (trade name) (polyimide varnish, Hitachi Kasei K.K.) | Liquid crystal material (C) |

TABLE 4

| Comp. Example | Contrast ratio | Delay in optical response (sec) | Flickering |
|---|---|---|---|
| 1 | 8:1 | 1.5 | observed |
| 2 | 7:1 | 2.5 | observed |
| 3 | 10:1 | 1.2 | observed |
| 4 | 8:1 | 2.2 | observed |

EXAMPLE 6

Two 1.1 mm-thick glass plates each provided with a 1000 Å-thick ITO film were respectively coated with a 3.0 wt. % solution of a polyamide acid represented by the formula shown below in a mixture solvent of N-methylpyrrolidone/n-butylcellosolve=2/1 by means of a spinner rotating at 3000 rpm.

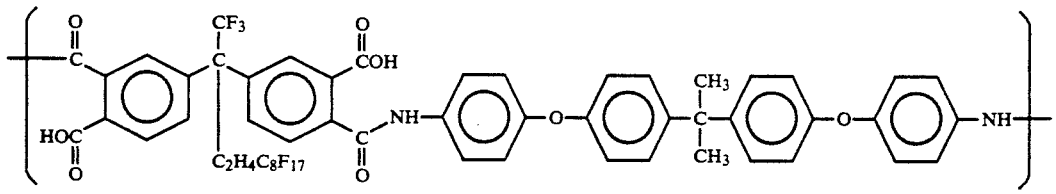

After the coating, the film was subjected to curing under heating at 250° C. for about an hour to form a 450 Å-thick film. The coating film was then rubbed in one direction with a nylon-planted cloth.

On one of the two glass plates thus treated, 1.5 μm alumina beads were dispersed, and the other glass plate was superposed thereon so that their rubbing axes were parallel to each other and disposed in the same direction to form a blank cell.

The blank cell was filled with a ferroelectric smectic liquid crystal ("CS-1014" (trade name), available from Chisso K.K.) under vacuum and, after sealing, was gradually cooled from isotropic phase at a rate of 0.5° C./hour to 30° C., whereby an alignment was effected.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=15 degrees, transmittance in the brightest state=36%, transmittance in the darkest state=1.8% contrast ratio=20:1.

When the degree of overshooting was measured by a photomultiplier, little overshooting was observed as show in FIG. 13A, and it was not noticeable by eye observation. The delay in optical response causing after-image was 0.2 sec or less.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized.

EXAMPLE 7

100 wt. parts of 2,2-bis[4-[4-aminophenoxy)-phenyl]-propane, 10 wt. parts of $C_{10}H_2NH_2$, and 100 wt. parts of 3,3', 4,4'-tetracarboxybiphenyl anhydride were reacted for 6 hours in 400 g of N-methylpyrrolidone to form a 3 wt. % solution of a polyamide acid represented by the following formula:

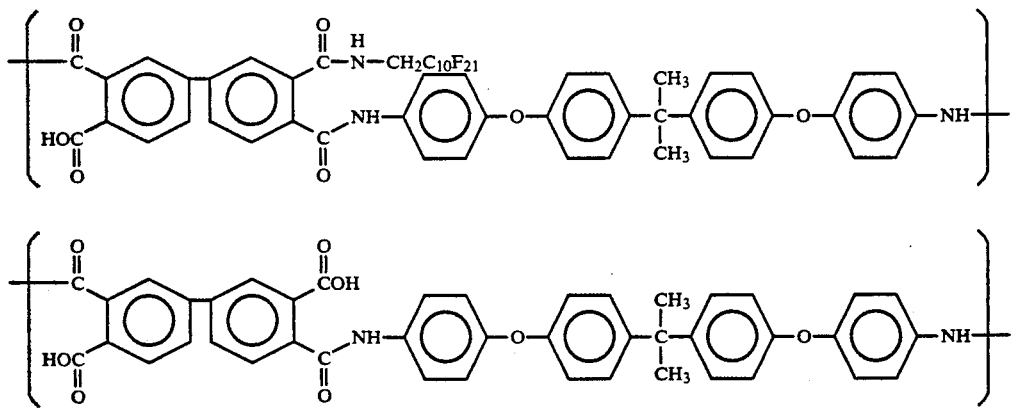

A liquid crystal device was prepared by using the polyamide acid solution otherwise in the same manner as in Example 6.

The device was tested in the same manner as in Example 6 to result in a contrast of 20:1, a delay in optical response of 0.2 sec and almost unnoticeable flickering. As a result of multiplexing drive in the same manner as in Example 6, similar results as in Example 6 were obtained.

EXAMPLES 8-11

Liquid crystal cells were prepared in the same manner as in Example 6 except that the alignment control films (in terms of precursor polyamide acids represented by the formulas) and liquid crystal materials shown in Table 5 below were used.

The respective cells were tested in the same manner as in Example 6, whereby measured data of contrast ratio and delay time in optical response shown in Table 6 appearing hereinafter were obtained.

The respective cells were subjected to the multiplexing drive for display in the same manner as in Example 6, whereby similar results were attained with respect to contrast and after-image.

TABLE 5

| Example | Alignment film (precursor polyamide acid) | Liquid crystal material |
|---|---|---|
| 3 | [structure] | "CS-1014" (trade name) (FLC, Chisso K.K.) |
| 4 | [structure] | "CS-1014" (trade name) (FLC, Chisso K.K.) |
| 5 | [structure] | Liquid crystal material (B) described before |
| 6 | [structure] | Liquid crystal material (B) described before |

TABLE 5-continued

| Example | Alignment film (precursor polyamide acid) | Liquid crystal material |
|---|---|---|

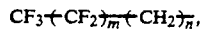

TABLE 6

| Example | Contrast ratio | Delay in optical response (sec) | Flickering |
|---|---|---|---|
| 8 | 18:1 | 0.1 | none |
| 9 | 20:1 | 0.3 | none |
| 10 | 17:1 | 0.2 | none |
| 11 | 20:1 | 0.3 | none |

As is understood from the above Examples and Comparative Examples, the liquid crystal device according to the present invention provides a high-quality display which is characterized by a high contrast between the bright and dark states, particularly a very large contrast at the time of multiplexing drive and freeness from unpleasant flickering or after-image. Thus, it is possible to produce an excellent liquid crystal display device and an excellent liquid crystal optical shutter.

What is claimed is:

1. A liquid crystal device, comprising:
a pair of substrates, each of said substrates being provided with a transparent electrode, and a chiral smectic liquid crystal disposed between the substrates; wherein
said substrates each have thereon an alignment film comprising a polyimide having as a side chain a fluoroalkyl chain group according to the formula $$CF_3\text{--}(CF_2)_m\text{--}(CH_2)_n,$$

wherein m in an integer of 3-10, and n is 0 or an integer of 1-4, and wherein
both alignment films are provided with a uniaxial alignment axis in direction which are generally the same and are (i) parallel to each other or (ii) cross each other at an intersection angle of 2-15 degrees.

2. A device according to claim 1, wherein the chiral smectic liquid crystal is disposed in a texture comprising a plurality of bent smectic layers of similar shape each comprising a plurality of liquid crystal molecules.

3. A device according to claim 1, wherein said uniaxial alignment axis is a rubbing axis.

4. A liquid crystal device, comprising:
a pair of substrates, each of said substrates being provided with a transparent electrode, and a chiral smectic liquid crystal disposed between the substrates; wherein
said substrates each have thereon an alignment film comprising a polyimide having as a side chain a fluoroalkyl chain group according to the formula $$CF_3\text{--}(CF_2)_m\text{--}(CH_2)_n,$$

wherein m in an integer of 3-10, and n is 0 or an integer of 1-4, and wherein
both alignment films are provided with a uniaxial alignment axis in directions which are generally opposite and are (i) parallel to each other or (ii) cross each other at an intersection angle of 2-15 degrees.

5. A device according to claim 4, wherein the chiral smectic liquid crystal is disposed in a texture comprising a plurality of inclined smectic layers of similar shape each comprising a plurality of liquid crystal molecules.

6. A device according to claim 4, wherein said uniaxial alignment axis is a rubbing axis.

7. A liquid crystal device, comprising:
a pair of substrates, each of said substrates being provided with a transparent electrode, and a chiral smectic liquid crystal disposed between the substrates; wherein
said pair of substrates each have thereon an alignment film comprising a polyamideimide having a fluoroalkyl chain group as a side chain, and both alignment films are provided with a uniaxial alignment axis in directions which are generally opposite and are (i) parallel to each other or (ii) cross each other at an intersection angle of 2-15 degrees, and wherein
the chiral smectic liquid crystal is disposed in a texture comprising a plurality of bent smectic layers of similar shape each comprising a plurality of liquid crystal molecules.

8. A liquid crystal device, comprising: a pair of substrates each provided with a transparent electrode, and a chiral smectic liquid crystal disposed between the substrates; wherein said pair of substrates each have thereon an alignment film comprising a polyamideimide having a fluoroalkyl chain group as a side chain, and both alignment films are provided with a uniaxial alignment axis in directions which are generally opposite and are parallel to each other or cross each other at an intersection angle of 2-15 degrees.

9. A device according to claim 8, wherein the chiral smectic liquid crystal is disposed in a texture comprising a plurality of inclined smectic layers of similar shape each comprising a plurality of liquid crystal molecules.

* * * * *

UNITED STATES PATENT AND TRADEMARK OFFICE
CERTIFICATE OF CORRECTION

PATENT NO. : 5,325,219
DATED : June 28, 1994
INVENTOR(S) : YUKIO HANYU, ET AL.

It is certified that error appears in the above-identified patent and that said Letters Patent is hereby corrected as shown below:

COLUMN 4

Line 11, "SIO$_2$," should read --SiO$_2$,--.
Line 37, "indicated" should read --(indicated--.
Line 38, "FIG. 1," should read --FIG. 1),--.

COLUMN 15

Formula [13], " 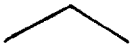 " should read -- 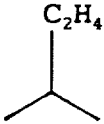 C$_2$H$_4$C$_3$F$_7$ --.

COLUMN 20

Line 28, "moment" should read --moments--.

COLUMN 24

Line 12, "date" should read --data--.
Line 22, "formulas" should read --formulas)--.

COLUMN 25

Line 31, "for," should read --for--.

COLUMN 26

Line 48, "1.8%" should read --1.8%,--.
Line 63, "[4-[4" should read --[4-(4--.

UNITED STATES PATENT AND TRADEMARK OFFICE
CERTIFICATE OF CORRECTION

PATENT NO. : 5,325,219
DATED : June 28, 1994
INVENTOR(S) : YUKIO HANYU, ET AL.

It is certified that error appears in the above-identified patent and that said Letters Patent is hereby corrected as shown below:

COLUMN 27

| TABLE 5, " Example | should read | -- Example |
|---|---|---|
| 3 | | 8 |
| 4 | | 9 |
| 5 | | 10 |
| 6 " | | 11 --. |

COLUMN 29

Line 47, "in" should read --is--.
Line 50, "in direction" should read --having directions--.

COLUMN 30

Line 19, "in" should read --is--.

Signed and Sealed this

Third Day of January, 1995

BRUCE LEHMAN

Attest:

Attesting Officer    Commissioner of Patents and Trademarks